United States Patent
Sakakibara (10) Patent No.: US 10,668,818 B2
(45) Date of Patent: Jun. 2, 2020

(54) VEHICLE WITH CHARGE CONTROLLER CONTROLLING VEHICLE-MOUNTED CHARGER

(71) Applicant: HONDA MOTOR CO., LTD., Tokyo (JP)

(72) Inventor: Naoya Sakakibara, Wako (JP)

(73) Assignee: HONDA MOTOR CO., LTD., Tokyo (JP)

(*) Notice: Subject to any disclaimer, the term of this patent is extended or adjusted under 35 U.S.C. 154(b) by 38 days.

(21) Appl. No.: 15/992,995

(22) Filed: May 30, 2018

(65) Prior Publication Data

US 2018/0345802 A1    Dec. 6, 2018

(30) Foreign Application Priority Data

May 30, 2017    (JP) ................ 2017-106300

(51) Int. Cl.
| | | |
|---|---|---|
| *B60L 50/15* | (2019.01) | |
| *B60L 11/18* | (2006.01) | |
| *B60L 53/14* | (2019.01) | |
| *B60L 3/00* | (2019.01) | |
| *H02J 7/00* | (2006.01) | |
| *H01M 10/44* | (2006.01) | |

(52) U.S. Cl.
CPC ........ *B60L 11/1814* (2013.01); *B60L 50/15* (2019.02); *B60L 53/14* (2019.02); *B60L 3/0046* (2013.01); *B60L 2240/30* (2013.01); *H01M 10/44* (2013.01); *H02J 7/0026* (2013.01); *H02J 2207/40* (2020.01)

(58) Field of Classification Search
CPC .................................. B60L 11/1814
USPC ........................................... 320/109
See application file for complete search history.

(56) References Cited

U.S. PATENT DOCUMENTS

2012/0049794 A1* 3/2012 Han ............ B60L 1/003
                                    320/109
2012/0098490 A1* 4/2012 Masuda ........... B60L 53/18
                                    320/109
(Continued)

FOREIGN PATENT DOCUMENTS

| JP | 2011-217544 A | 10/2011 |
| JP | 2013-34308 A | 2/2013 |
| JP | 2013-233021 A | 11/2013 |

OTHER PUBLICATIONS

Office Action dated Oct. 16, 2018, issued in counterpart Japanese Application No. 2017-106300. (3 pages).

*Primary Examiner* — Yalkew Fantu
(74) *Attorney, Agent, or Firm* — Westerman, Hattori, Daniels & Adrian, LLP (57) ABSTRACT

A vehicle includes a high-voltage battery, a vehicle-mounted charger, an inlet, a charging ECU that controls the vehicle-mounted charger, and a parking lock mechanism that causes a rotation shaft to enter the rotation capable state or the rotation incapable state. The rotation shaft is provided for a gearbox which transmits driving power to the driving wheels. The charging ECU includes a backup RAM in which lock state information of the parking lock mechanism is written. When the high-voltage battery is to be charged with a charging connector of an external charger being connected to the inlet, the charging ECU uses the information stored in the backup RAM to control the vehicle-mounted charger.

11 Claims, 2 Drawing Sheets

(56) References Cited

U.S. PATENT DOCUMENTS

| | | | |
|---|---|---|---|
| 2013/0221921 A1* | 8/2013 | Ang | B60L 15/007 |
| | | | 320/109 |
| 2013/0257375 A1* | 10/2013 | Ang | H02J 7/022 |
| | | | 320/109 |
| 2013/0260595 A1* | 10/2013 | Tamaki | H01R 13/6272 |
| | | | 439/345 |
| 2015/0137594 A1* | 5/2015 | Yamazaki | H01M 10/44 |
| | | | 307/10.1 |
| 2015/0280593 A1* | 10/2015 | Ando | H02M 1/42 |
| | | | 363/17 |

* cited by examiner

FIG. 1

VEHICLE WITH CHARGE CONTROLLER CONTROLLING VEHICLE-MOUNTED CHARGER

CROSS REFERENCES TO RELATED APPLICATIONS

The present application claims priority under 35 U.S.C. § 119 to Japanese Patent Application No. 2017-106300, filed May 30, 2017, entitled "VEHICLE." The contents of this application are incorporated herein by reference in their entirety.

TECHNICAL FIELD

The present disclosure relates to a vehicle. More specifically, the present disclosure relates to a vehicle in which power from an external power supply may be supplied to an energy storage through a vehicle-mounted charger.

BACKGROUND

An electrically driven vehicle travels in such a manner that power supplied from a battery is used to drive a motor. A battery mounted in the electrically driven vehicle may be charged in such a manner that a connector of a charging cable connected to a power supply source in the outside of the vehicle, such as a normal charging facility or a fast charging facility, is connected to an inlet provided on the electrically driven vehicle. Such external charging may be performed with the vehicle being parked on a slope. In this case, when external charging is started without operating a so-called parking lock mechanism, the vehicle may move during the external charging, causing the charging cable to drop off during supply of power.

Japanese Unexamined Patent Application Publication No. 2013-233021 describes a charging system in which a battery mounted in the vehicle is connected to electrical equipment in the outside of the vehicle through a cable and which enables power to be supplied from the battery to the electrical equipment. In the charging system described in Japanese Unexamined Patent Application Publication No. 2013-233021, only in the case where the ignition switch is in the off state and where the shift range is set to the parking state, charging from the battery to the electrical equipment is started. Therefore, use of such a technique may avoid a state in which a cable drops off during supply of power.

In vehicles, many computers, such as a driving control module that controls a driving device including the parking lock mechanism and an external-charging control module that controls a vehicle-mounted charger, are mounted. When the ignition switch is switched off, these vehicle-mounted computers enter the sleep state or the idle state in order to suppress consumption of excess power.

In contrast, external charging of a battery is often started in the state in which the ignition switch is switched off. Therefore, in the case where the technique described in Japanese Unexamined Patent Application Publication No. 2013-233021 is applied to an external charging technique for vehicles, when external charging is started after the ignition switch is switched off, it is necessary to operate also the driving control module in order to check the operation state of the parking lock mechanism. Therefore, excess power for operating the driving control module may be consumed, or it may take time until external charging is started.

SUMMARY

It is desirable to provide a vehicle which enables external charging to be started without consumption of excess power.

(1) In one embodiment a vehicle (for example, a vehicle V described below) includes an energy storage (for example, a high-voltage battery 2 described below), a vehicle-mounted charger (for example, a vehicle-mounted charger 54 described below), an inlet (for example, an inlet 51 described below) connected to the energy storage through the vehicle-mounted charger, and a charge control device (for example, a charging ECU 60 described below) that controls the vehicle-mounted charger. The inlet is connected to a connector (for example, a charging connector 93 described below) of an external power supply (for example, an external power source 90 described below). Power from the external power supply is capable of being supplied to the energy storage through the vehicle-mounted charger. The vehicle includes a lock mechanism (for example, a parking lock mechanism 82 described below) that causes a rotation shaft (for example, a rotation shaft 80 described below) to enter a rotation capable state or a rotation incapable state. The rotation shaft is provided for a driving-power transmitting mechanism (for example, a gearbox 81 described below) transmitting driving power to a driving wheel. The charge control device includes a storage medium (for example, a backup RAM 60*a* described below) in which lock state information of the lock mechanism is written. In charging the energy storage by connecting the connector to the inlet, the information stored in the storage medium is used to control the vehicle-mounted charger.

(2) In this case, when the lock state information stored in the storage medium describes that the rotation shaft is in the rotation incapable state, the charge control device desirably causes the vehicle-mounted charger to be ready for supply of power from the external power supply to the energy storage.

(3) In this case, the lock mechanism desirably includes an electromagnetic actuator (for example, parking actuator 82*b* described below) that switches the rotation shaft between the rotation capable state and the rotation incapable state. Desirably, the vehicle further includes a lock control device (for example, a shifter ECU 86 and a shift driver 84 which are described below) that drives the electromagnetic actuator according to a driver's operation on an operation unit (for example, a shift operation panel 85 described below).

(4) In this case, the lock control device desirably includes a different storage medium which is separate from the storage medium and in which the lock state information of the lock mechanism is successively written. In response to switching off a power switch (for example, an ignition switch 89 described below), the lock state information stored in the different storage medium is desirably written in the storage medium.

(1) According to one embodiment, the lock state information of the lock mechanism is written in the storage medium included in the charge control device. This exerts the following effect. That is, external charging of the energy storage is to be started after the power switch is switched off and the connector of the external power supply is then connected to the inlet of the vehicle. At that time, the lock state of the rotation shaft which is produced by the lock mechanism is checked. To do this, without operating a sensor for detecting the lock state and the control device connected to the sensor, the current lock state information may be grasped on the basis of the information stored in the storage medium included in the charge control device. Therefore, external charging may be started without consumption of excess power for operating a sensor provided for the lock mechanism, its control device, and the like.

(2) When the lock state information stored in the storage medium describes that the rotation shaft is in the rotation incapable state, the charge control device described in the present disclosure causes the vehicle-mounted charger to be ready for supply of power from the external power supply to the energy storage. This inhibits the charging cable provided with the connector from dropping off due to the vehicle moving during external charging.

(3) The vehicle described in one embodiment is a so-called shift-by-wire system including the lock control device which drives the electromagnetic actuator that switches the rotation shaft between the rotation capable state and the rotation incapable state by using the lock mechanism in accordance with a driver's operation on the operation unit. Compared with a shift mechanism of the related art which mechanically connects an operation unit to a lock mechanism, such a shift-by-wire system has advantages in various aspects, such as operability and const. However, it is difficult to grasp the lock state produced by the lock mechanism, without operating the lock control device. Therefore, the above-described issue arising when external charging is performed after the power switch is switched off is conspicuous. In contrast, according to one embodiment, even after the power switch is switched off, the lock state information may be grasped without operating the lock control device. That is, according to one embodiment, the issue caused by adoption of a shift-by-wire system may be addressed, and the advantages may be gained.

(4) According to one embodiment, the lock state information of the lock mechanism is successively written in the different storage medium included in the lock control device. In response to switching off the power switch, the lock state information stored in the different storage medium is written in the storage medium included in the charge control device. This exerts the following effect. That is, external charging of the energy storage is to be started after the power switch is switched off and the connector of the external power supply is then connected to the inlet of the vehicle. At that time, without operating the lock control device, the current lock state information may be grasped on the basis of the information stored in the storage medium of the charge control device. Therefore, according to one embodiment, external charging may be started without consumption of excess power for operating the lock control device. In the above explanation of the exemplary embodiment, specific elements with their reference numerals are indicated by using brackets. These specific elements are presented as mere examples in order to facilitate understanding, and thus, should not be interpreted as any limitation to the accompanying claims.

BRIEF DESCRIPTION OF THE DRAWINGS

The advantages of the disclosure will become apparent in the following description taken in conjunction with the following drawings.

DETAILED DESCRIPTION

An embodiment of the present disclosure will be described below with reference to the drawings.

Figure 1:
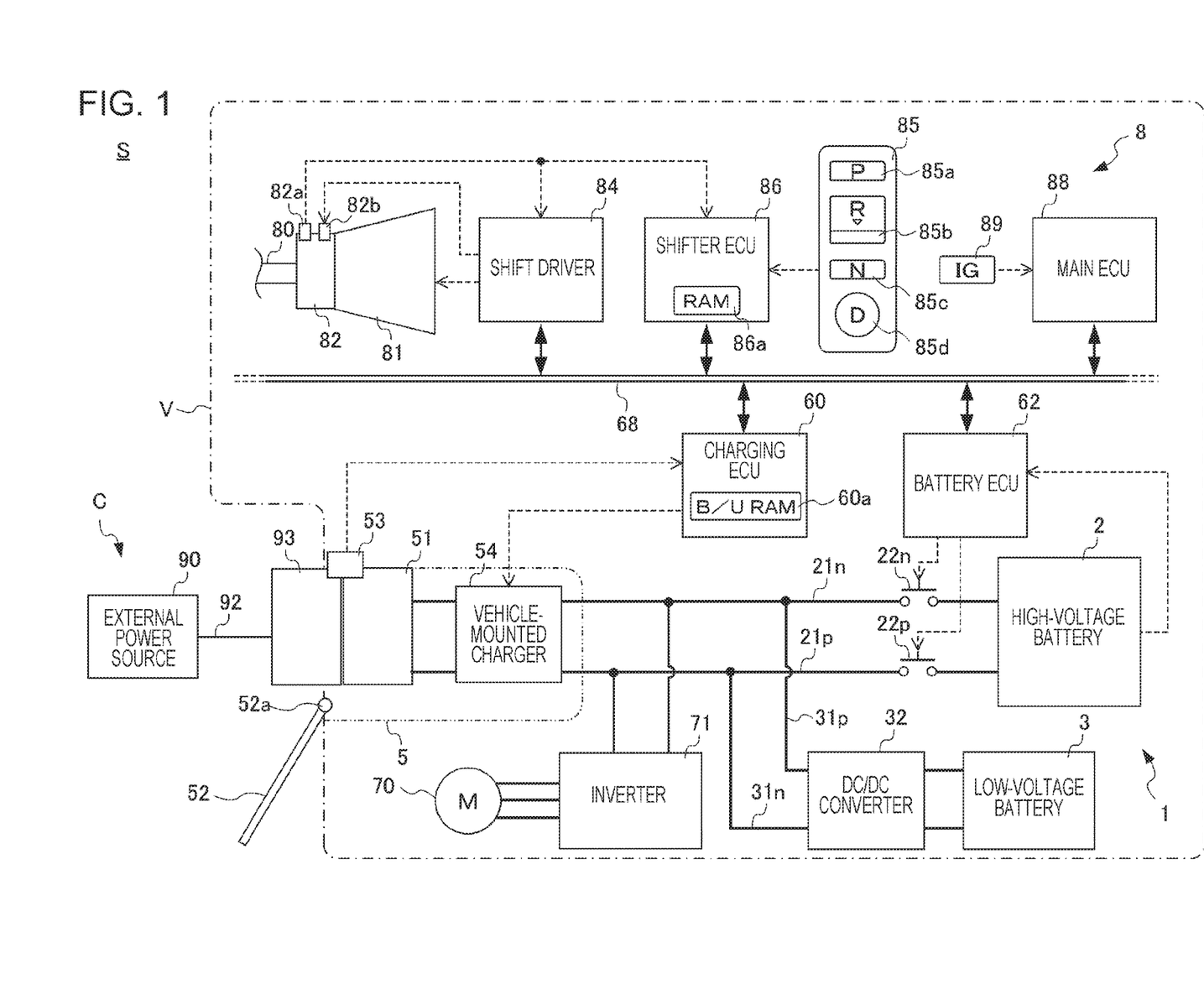
FIG. 1 is a diagram illustrating a configuration of a vehicle and an external charger for the vehicle, according to an embodiment of the present disclosure.

FIG. 1 is a diagram illustrating the configuration of a charging system S formed in combination with a vehicle V and an external charger C, according to the present embodiment. The vehicle V will be described below as a so-called hybrid vehicle including an engine (not illustrated) and a drive motor 70 which serve as power sources for driving the driving wheels. However, the present disclosure is not limited to this. The present disclosure may be applied to an electrically driven vehicle using only a motor as a power source.

The external charger C includes an external power source 90 that outputs alternating current (specifically, for example, AC 200 V), a user-operable charging connector 93, and a charging cable 92 that connects the external power source 90 to the charging connector 93. When a user is to use the external charger C to perform charging (hereinafter simply referred to as "external charging") of a high-voltage battery 2 and a low-voltage battery 3 which are mounted in the vehicle V, the user connects the charging connector 93 to an inlet 51 provided on the vehicle V. A connection of the charging connector 93 to the inlet 51 causes the charging cable 92 to be electrically connected to first power lines 21p and 21n which are described below. This prepares a supply of power from the external power source 90 of the external charger C to a vehicle-mounted charger 54, which is described below and which is mounted in the vehicle V, and further to the batteries 2 and 3.

The vehicle V includes the drive motor 70 and an engine (not illustrated) that generate driving power for travelling, an inverter 71 connected to the drive motor 70, a shift-by-wire system 8 (hereinafter abbreviated as an "SBW system 8") that changes the speed of the driving power generated by the engine and the drive motor 70 and transmits the resulting driving power to the driving wheels (not illustrated), the power supply system 1 that serves as a power supply source of electrical equipment mounted in the vehicle V, such as the drive motor 70, the inverter 71, and the SBW system 8.

The drive motor 70 is, for example, a three-phase alternating-current motor. A supply of power from the high-voltage battery 2 of the power supply unit 1 through the inverter 71 causes the drive motor 70 to generate driving power. The drive motor 70 also generates power through a regenerative operation. The power generated through a regenerative operation of the drive motor 70 is supplied, for charging, to the high-voltage battery 2 and the low-voltage battery 3 through the inverter 71.

The inverter 71 connected to the first power lines 21p and 21n described below converts, into three-phase alternating current, direct current (DC) supplied from the high-voltage battery 2 through the first power lines 21p and 21n, and supplies the resulting alternating current to the drive motor 70. In addition, in the regenerative operation of the drive motor 70, the inverter 71 converts, into direct current, alternating current supplied from the drive motor 70, and supplies the resulting direct current to the high-voltage battery 2 and the low-voltage battery 3.

The power supply system 1 includes the high-voltage battery 2, the low-voltage battery 3 for a lower voltage than the high-voltage battery 2, an external charging unit 5 connected to the external charger C, the first positive power line 21p and the first negative power line 21n (hereinafter collectively referred to the "first power lines 21p and 21n") that connect the external charging unit 5 to the high-voltage battery 2, a second positive power line 31p and a second negative power line 31n (hereinafter collectively referred to as "second power lines 31p and 31n") that connect the first power lines 21p and 21n to the low-voltage battery 3, a DC/DC converter 32 provided for the second power lines 31p and 31n, and a charging electronic control unit (ECU) 60 and a battery ECU 62 that are multiple electronic control modules for controlling these.

The high-voltage battery 2 is a secondary battery which is capable of being discharged so that chemical energy is converted into electrical energy, and of being charged so that electrical energy is converted into chemical energy. The case in which a so-called lithium ion battery in which lithium ions move between electrodes for charging and discharging is used as the high-voltage battery 2 will be described below. However, the present disclosure is not limited to this.

A main positive contactor 22p and a main negative contactor 22n (hereinafter collectively referred to as "main contactors 22p and 22n") which connect and disconnect the first power lines 21p and 21n are provided in portions of the first power lines 21p and 21n, which extend from the high-voltage battery 2 to the external charging unit 5. The portions of the first power lines 21p and 21n are located between the high-voltage battery 2 and the portions in which the inverter 71 are connected to the first power lines 21p and 21n.

The main contactors 22p and 22n are normally open units which are open in the state in which no instruction signals are received from the outside. The main contactors 22p and 22n are closed in response to an instruction signal from the battery ECU 62. More specifically, for example, in the case where charging and discharging are performed between the high-voltage battery 2 and the inverter 71 while the vehicle V is travelling, or in the case where power from the external charger C is supplied to the high-voltage battery 2 to perform external charging on the high-voltage battery 2, the main contactors 22p and 22n are closed in response to an instruction signal from the battery ECU 62.

Similarly to the high-voltage battery 2 described above, the low-voltage battery 3 is a secondary battery that is capable of being both charged and discharged. The case in which a lead acid battery using lead as electrodes is used as the low-voltage battery 3 will be described below. However, the present disclosure is not limited to this.

As the high-voltage battery 2 and the low-voltage battery 3, batteries having different characteristics are used. More specifically, compared with the low-voltage battery 3, a battery having a high output voltage and a high power density and having a large battery capacity is used as the high-voltage battery 2.

The DC/DC converter 32 increases or decreases the output voltage on the first power lines 21p and 21n side or on the low-voltage battery 3 side.

The external charging unit 5 includes the inlet 51 that is connectable to the charging connector 93, a charging lid 52 for protecting the inlet 51, a connector sensor 53 that detects a connection of the charging connector 93 to the inlet 51, and the vehicle-mounted charger 54 provided for the first power lines 21p and 21n. The external charging unit 5 is provided in a side portion of the vehicle V.

The inlet 51 is provided with terminals of the first power lines 21p and 21n. When the charging connector 93 is connected to the inlet 51, the charging cable 92 on the external charger C side is electrically connected to the first power lines 21p and 21n on the vehicle V side.

The plate-like charging lid 52 is pivoted so as to be openable by using a hinge 52a provided on the vehicle body (not illustrated) of the vehicle V. When the charging lid 52 is closed, the charging lid 52 forms a portion of the outer panel of the vehicle V, causing the inlet 51 to be protected. When the charging lid 52 is opened, the inlet 51 is exposed to the outside. This enables a user to connect the charging connector 93 to the inlet 51.

The vehicle-mounted charger 54 converts alternating current from the external power source 90 into direct current, supplies the resulting direct current through the first power lines 21p and 21n to the high-voltage battery 2, supplies the resulting direct current through the DC/DC converter 32 to the low-voltage battery 3, and supplies the resulting direct current to auxiliary equipment such as a battery heater (not illustrated). The vehicle-mounted charger 54 includes an insulating DC-DC converter which is driven by the charging ECU 60 and which serves as a unit controlling the direct current. Thus, just a connection of the charging connector 93 to the inlet 51 does not cause the external power source 90 to supply power to the high-voltage battery 2 and the low-voltage battery 3. Therefore, the external power source 90 may supply power to the high-voltage battery 2 and the low-voltage battery 3 only after the following operations: the charging connector 93 is connected to the inlet 51; the main contactors 22p and 22n are closed; and the charging ECU 60 starts to drive the vehicle-mounted charger 54.

While the charging connector 93 is not connected to the inlet 51, the connector sensor 53 stays in the off state. When the charging connector 93 is connected to the inlet 51, the connector sensor 53 transmits, to the charging ECU 60, a signal indicating the connection. The charging ECU 60 determines whether or not the charging connector 93 is connected to the inlet 51 on the basis of a detection signal from the connector sensor 53.

The charging ECU 60 and the battery ECU 62 each are a microcomputer including an input/output (I/O) interface for performing analog-digital (A/D) conversion on detection signals from various sensors, a random-access memory (RAM) and a read-only memory (ROM) for storing various programs and data, a central processing unit (CPU) that performs various computation processes according to the programs, and a driving circuit that drives various types of electronic equipment according to computation results from the CPU. The electronic control modules of the charging ECU 60, the battery ECU 62, and the like are connected to each other through a controller area network (CAN) bus 68 that is a bus network for receiving/transmitting various type of control information, enabling reception/transmission of necessary control information among these modules.

The charging ECU 60 is a microcomputer that performs external charging control (see FIG. 2 described below) performed by the high-voltage battery 2 mainly by using the external charger C. The charging ECU 60 includes a backup RAM 60a serving as a storage medium in which the recorded information is retained even after, in response to an operator's operation of an ignition switch 89 described below, supply of power from an auxiliary equipment battery (not illustrated) is stopped and the idle state is temporarily entered. When external charging control is performed after the ignition switch 89 is operated, the charging ECU 60 uses the information stored in the backup RAM 60a. The information written in the backup RAM 60a will be described in detail below by referring to FIG. 2.

The battery ECU 62 is a microcomputer that performs control, for example, about turning on/off the main contactors 22p and 22n and monitoring the state of the high-voltage battery 2. The battery ECU 62 is connected to a voltage sensor that detects the voltage of the high-voltage battery 2, a current sensor that detects the output current or the charging current of the high-voltage battery 2, and a battery temperature sensor that detects the temperature of the high-voltage battery 2 (which are not illustrated). The battery ECU 62 uses detection signals from these sensors to estimate the charging rate (which is a percentage indicating a rate of the remaining battery capacity to the full-charge capacity, and is hereinafter referred to also as the "state of charge (SOC)") of the high-voltage battery 2 on the basis of a known algorithm.

The SBW system 8 includes a rotation shaft 80 that transmits, to the driving wheels (not illustrated), driving power generated by the engine and the drive motor 70, a gearbox 81 provided for the rotation shaft 80, a shift driver 84 that drives the gearbox 81, a shift operation panel 85 that is operable when an operator performs an operation for changing the speed, a shifter ECU 86 that transmits a control signal to the shift driver 84 according to a signal from the shift operation panel 85, and a main ECU 88.

The gearbox 81 changes the speed of the driving power generated by the engine and the drive motor 70 for transmission to the rotation shaft 80. The gearbox 81 includes a parking lock mechanism 82 that causes the rotation shaft 80 to enter the rotation capable state or the rotation incapable state, and a parking position sensor 82*a* that detects the operation state of the parking lock mechanism 82.

The parking lock mechanism 82 includes, for example, a parking gear fixed to the rotation shaft 80, a parking pawl which is pivotally provided with respect to the parking gear and which has a hook that selectively engages with the parking gear, and a parking actuator 82*b* that makes the hook of the parking pawl come close to or be separated from the parking gear. The parking actuator 82*b* operates in accordance with a signal received from the shift driver 84. That is, the parking actuator 82*b* is driven so that the hook of the parking pawl engages with the parking gear. Thus, the rotation shaft 80 enters the rotation incapable state, that is, the parking lock state. In addition, the parking actuator 82*b* is driven so that the hook of the parking pawl is separated from the parking gear. Thus, the rotation shaft 80 enters the rotation capable state, that is, the parking lock release state.

The parking position sensor 82*a* detects the operation state of the parking lock mechanism 82, and transmits a corresponding detection signal to the shifter ECU 86. More specifically, in the case where the parking lock state has been entered, the parking position sensor 82*a* transmits a corresponding signal to the shifter ECU 86 and the shift driver 84. In the case where the parking lock release state has been entered, the parking position sensor 82*a* transmits a corresponding signal to the shifter ECU 86 and the shift driver 84.

The shift operation panel 85 is provided inside the vehicle at an accessible position for a driver's operation on the panel, for example, on the center console. The shift operation panel 85 is provided with switches 85*a*, 85*b*, 85*c*, and 85*d* pressed when a driver is to change the speed. The parking lock switch 85*a* is pressed by a driver when the parking lock state or the parking lock release state is to be entered. The reverse switch 85*b* is pressed by a driver when the gearbox 81 is to enter the reverse state. The neutral switch 85*c* is pressed by a driver when the gearbox 81 is to enter the neutral state. The drive switch 85*d* is pressed by a driver when the gearbox 81 is to enter the drive state. When these switches 85*a* to 85*d* are operated by a driver, the switches 85*a* to 85*d* transmit corresponding signals to the shifter ECU 86.

The shifter ECU 86 and the main ECU 88 each are a microcomputer including an I/O interface for performing A/D conversion on detection signals from various sensors, a RAM and a ROM for storing various programs and data, a CPU that performs various computation processes according to the programs, and a driving circuit that drives various types of electronic equipment according to computation results from the CPU. The shifter ECU 86, the main ECU 88, and the shift driver 84 are connected to one another through the CAN bus 68 as illustrated in FIG. 1. Thus, the charging ECU 60, the battery ECU 62, the shift driver 84, the shifter ECU 86, and the main ECU 88 described above are capable of being receiving/transmitting necessary control information.

The shifter ECU 86 is a microcomputer that mainly controls the gearbox 81. More specifically, in accordance with a driver's operation, which is detected through the shift operation panel 85, of changing the speed, the shifter ECU 86 transmits, to the shift driver 84, a control signal for driving the gearbox 81 so that the speed is changed. The shifter ECU 86 includes a RAM 86*a* that serves as a different storage medium storing lock state information describing the operation state of the parking lock mechanism 82. At least while power from the low-voltage battery 3 is supplied, the shifter ECU 86 successively obtains lock state information from the parking position sensor 82*a*, and successively writes the lock state information (that is, whether the parking lock state or the parking lock release state has been entered) in the RAM 86*a*.

The main ECU 88 is a microcomputer that performs overall control of the drive motor 70, the inverter 71, the SBW system 8, the power supply system 1, and the like. The main ECU 88 is connected to the ignition switch 89 switched on/off by a driver when the vehicle V is to be started/stopped.

When a driver switches the ignition switch 89 from off to on, the main ECU 88 starts a vehicle start control process of supplying power from the auxiliary equipment battery (not illustrated) to various types of electrical equipment included in the power supply system 1 and the SBW system 8 so that the electrical equipment and the engine are started. When a driver switches the ignition switch 89 from on to off, the main ECU 88 starts a vehicle stopping control process (for example, see FIG. 2 described below) of stopping supply of power from the auxiliary equipment battery to the electrical equipment so that the electrical equipment enters the idle state and the engine is stopped.

In the vehicle V having the configuration described above, the electronic equipment, such as the charging ECU 60, the battery ECU 62, the shift driver 84, the shifter ECU 86, the main ECU 88, and the vehicle-mounted charger 54, is operated with power supplied from the low-voltage battery 3 and the functions of the electronic equipment are exhibited.

Figure 2:
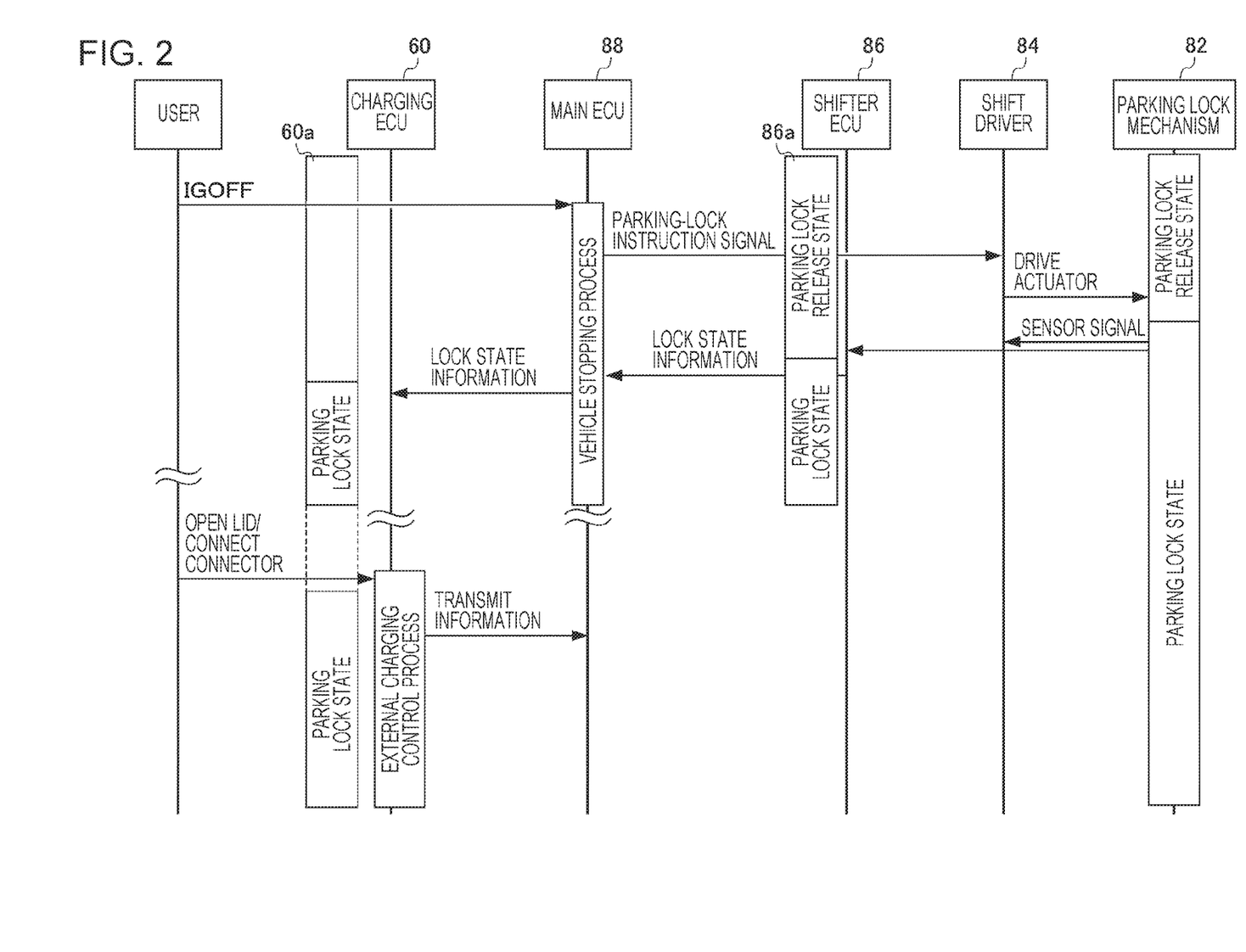
FIG. 2 is a sequence chart of a procedure performed after a vehicle is stopped till external charging is performed.

FIG. 2 is a sequence chart of a procedure performed after the vehicle V is stopped till external charging is performed.

To stop the vehicle V, a user (that is, a driver) who drives the vehicle V switches the ignition switch 89 from on to off. The main ECU 88 performs the vehicle stopping control process according to the procedure described below in response to detection of the operation of switching off the ignition switch 89.

In the stopping control process, the main ECU 88 determines whether or not the parking lock mechanism 82 is in the parking lock state at the time point when the ignition switch 89 is switched off. The main ECU 88 obtains, for example, a detection signal from the parking lock sensor 82*a* and the lock state information stored in the RAM 86*a* of the shifter ECU 86. Thus, the main ECU 88 may determine whether or not the parking lock mechanism 82 is in the parking lock state. In the example in FIG. 2, the case in which the parking lock mechanism 82 is in the parking lock release state is illustrated. That is, in the example in FIG. 2, the case in which the driver switches off the ignition switch 89 without pressing the parking lock switch 85a is illustrated.

When the current state of the parking lock mechanism 82 is not the parking lock state, the main ECU 88 transmits, to the shift driver 84, a signal (hereinafter referred to as a "parking-lock instruction signal") for switching from the parking lock release state to the parking lock state. The shift driver 84 drives the parking actuator 82b of the parking lock mechanism 82 on the basis of the parking-lock instruction signal from the main ECU 88. This causes the parking lock mechanism 82 to be switched from the parking lock release state to the parking lock state. The parking position sensor 82a transmits, to the shifter ECU 86 and the shift driver 84, a signal indicating that the parking lock mechanism 82 is in the parking lock state. In response to this, the shift driver 84 stops driving the parking actuator 82b.

In response to reception, from the parking position sensor 82a, of the signal indicating the parking lock mechanism 82 is in the parking lock state, the shifter ECU 86 writes the latest lock state information in the RAM 86a. The shifter ECU 86 transmits, to the main ECU 88, the latest lock state information stored in the RAM 86a. In response to reception of the latest lock state information from the shifter ECU 86, the main ECU 88 transmits the latest lock state information to the charging ECU 60. In response to reception of the latest lock state information from the main ECU 88, the charging ECU 60 writes the latest lock state information in the backup RAM 60a. As described above, when the ignition switch 89 is switched off, the latest lock state information stored in the RAM 86a of the shifter ECU 86 is written in the backup RAM 60a of the charging ECU 60.

After the latest lock state information is written in the backup RAM 60a according to the procedure described above, the main ECU 88 stops supply of power from the low-voltage battery 3 to the charging ECU 60, the shifter ECU 86, the main ECU 88, the shift driver 84, and the like, and causes these components to enter the idle state. Then, the main ECU 88 ends the stopping control process.

The procedure in which external charging is performed on the vehicle V having been subjected to the stopping control process described above will be described by referring to the lower part of FIG. 2.

While the vehicle V is stopped, when a user performs a preliminary operation for starting external charging (specifically, for example, the user operation of opening the charging lid 52 and connecting the charging connector 93 to the inlet 51), supply of power from the low-voltage battery 3 to the charging ECU 60 and the battery ECU 62 is started in response to this operation. This causes the charging ECU 60 and the battery ECU 62 to be returned from the idle state. When the charging ECU 60 is returned from the idle state, the charging ECU 60 starts an external charging control process according to the procedure described below.

In the external charging control process, the charging ECU 60 refers to the lock state information stored in the backup RAM 60a, and determines whether or not the parking lock mechanism 82 is currently in the parking lock state. As a result of the determination, when the lock state information describes that the parking lock mechanism 82 is in the parking lock state, the charging ECU 60 starts driving the vehicle-mounted charger 54, and prepares a supply of power from the external power source 90 to the high-voltage battery 2. The charging ECU 60 starts external charging of the high-voltage battery 2 in a way in accordance with the current SOC of the high-voltage battery 2. As a result of the determination, when the lock state information describes that the parking lock mechanism 82 is in the parking lock release state, the charging ECU 60 determines that the vehicle V may move. The charging ECU 60 does not start driving the vehicle-mounted charger 54, and maintains the state in which the external power source 90 is insulated from the high-voltage battery 2. While external charging of the high-voltage battery 2 is performed, the charging ECU 60 appropriately transmits, to the main ECU 88, information about this external charging.

The vehicle V according to the present embodiment exerts the effects described below.

(1) The lock state information of the parking lock mechanism 82 is written in the backup RAM 60a included in the charging ECU 60. This exerts the following effect. That is, external charging of the high-voltage battery 2 is to be started after the ignition switch 89 is switched off and the charging connector 93 of the external charger C is then connected to the inlet 51 of the vehicle V. At that time, the lock state of the rotation shaft 80 which is produced by the parking lock mechanism 82 is checked. To do this, without operating the parking position sensor 82a for detecting the lock state and without operating, for example, the shifter ECU 86 and the shift driver 84 which are connected to the sensor 82a, the lock state information at that time may be grasped on the basis of information stored in the backup RAM 60a of the charging ECU 60. Therefore, the vehicle V enables external charging to be started without consumption of excess power for operating the sensor 82a provided on the parking lock mechanism 82 and for operating, for example, the shifter ECU 86 and the shift driver 84 for the sensor 82a.

(2) When the lock state information stored in the backup RAM 60a describes that the rotation shaft 80 is in the rotation incapable state, the charging ECU 60 causes the vehicle-mounted charger 54 to be ready for supply of power from the external charger C to the high-voltage battery 2 and the low-voltage battery 3. This inhibits the charging cable 92 from dropping off due to the vehicle V moving during external charging.

(3) The vehicle V is a so-called shift-by-wire system including the shifter ECU 86 and the shift driver 84 which drives the parking actuator 82b that switches the rotation shaft 80 between the rotation capable state and the rotation incapable state by using the parking lock mechanism 82 in accordance with a driver's operation on the shift operation panel 85. Compared with the shift mechanism of the related art which mechanically connects the shift operation panel 85 to the parking lock mechanism 82, such a shift-by-wire system has advantages in various aspects, such as operability and cost. However, it is difficult to grasp the lock state produced by the parking lock mechanism 82, without operating the shifter ECU 86 and the shift driver 84. Therefore, the above-described issue arising when external charging is performed after the ignition switch 89 is switched off is conspicuous. In contrast, even after the ignition switch 89 is switched off, the vehicle V enables the lock state information to be grasped without operating the shifter ECU 86, the shift driver 84, and the like. That is, the vehicle V enables the issue caused by the adoption of a shift-by-wire system to be addressed, gaining the advantages.

(4) In the vehicle V, lock state information of the parking lock mechanism 82 is successively written in the RAM 86a included in the shifter ECU 86. In response to switching off the ignition switch 89, the lock state information stored in the RAM 86a is written in the backup RAM 60a included in the charging ECU 60. This exerts the following effect. That is, external charging of the high-voltage battery 2 and the low-voltage battery 3 is to be started after the ignition switch 89 is switched off and the charging connector 93 of the external charger C is then connected to the inlet 51 of the vehicle V. At that time, without operating the shifter ECU 86, the current lock state information may be grasped on the basis of the information stored in the backup RAM 60a of the charging ECU 60. Therefore, the vehicle V enables external charging to be started without consumption of excess power for operating the shifter ECU 86.

The embodiment of the present disclosure is described above. However, the present disclosure is not limited to this. The details of the configuration may be appropriately changed within the scope of the gist of the present disclosure.

For example, in the embodiment described above, in response to switching off the ignition switch 89, the latest lock state information stored in the RAM 86a of the shifter ECU 86 is written in the backup RAM 60a of the charging ECU 60. The timing at which the lock state information is written in the backup RAM 60a is not limited to this. For example, the lock state information stored in the RAM 86a may be successively written in the backup RAM 60a before the ignition switch 89 is switched off. Although a specific form of embodiment has been described above and illustrated in the accompanying drawings in order to be more clearly understood, the above description is made by way of example and not as limiting the scope of the invention defined by the accompanying claims. The scope of the invention is to be determined by the accompanying claims. Various modifications apparent to one of ordinary skill in the art could be made without departing from the scope of the invention. The accompanying claims cover such modifications.

What is claimed is:

1. A vehicle comprising:
an energy storage;
a vehicle-mounted charger;
an inlet connected to the energy storage through the vehicle-mounted charger; and
a charge controller configured to control the vehicle-mounted charger, the inlet being to be connected to a connector of an external power supply, power from the external power supply being capable of being supplied to the energy storage through the vehicle-mounted charger; and
a lock mechanism that causes a rotation shaft to enter a rotation capable unlock state or a rotation incapable lock state, the rotation shaft being provided to a driving-power transmitting mechanism transmitting driving power to a driving wheel,
wherein the charge controller includes a storage medium in which lock state information of the unlock state and the lock state of the lock mechanism is written,
wherein, in charging the energy storage by connecting the connector to the inlet, the lock state information stored in the storage medium is used to control the vehicle-mounted charger,
wherein the lock mechanism includes an electromagnetic actuator that switches the rotation shaft between the rotation capable unlock state and the rotation incapable lock state, and
wherein the vehicle further includes a lock controller that drives the electromagnetic actuator according to a driver's operation on an operation unit.

2. The vehicle according to claim 1,
wherein, when the lock state information stored in the storage medium describes that the rotation shaft is in the rotation incapable lock state, the charge controller causes the vehicle-mounted charger to be ready for supply of power from the external power supply to the energy storage.

3. The vehicle according to claim 2,
wherein, when the lock state information stored in the storage medium describes that the rotation shaft is in the rotation capable unlock state, the charge controller disables the vehicle-mounted charger to supply power from the external power supply to the energy storage.

4. The vehicle according to claim 1,
wherein the lock controller includes a different storage medium which is separate from the storage medium and in which the lock state information of the lock mechanism is successively written, and
wherein, in response to switching off a power switch, the lock state information stored in the different storage medium is written in the storage medium.

5. The vehicle according to claim 4,
wherein the different storage medium stores update of the lock state information of the lock mechanism successively.

6. The vehicle according to claim 4,
wherein, in response to switching off a main power switch of the vehicle, the lock state information stored in the different storage medium is written in the storage medium.

7. The vehicle according to claim 1,
wherein the storage medium is a volatile memory.

8. The vehicle according to claim 1,
wherein, upon connecting the connector to the inlet, the charge controller is activated to read the lock state information stored in the storage medium.

9. The vehicle according to claim 1,
wherein the lock controller is controlled by a Shift-By-Wire system.

10. A vehicle charging method comprising steps of:
detecting, by a computer, connection of a connector of an external power supply to an inlet of a vehicle for charging power to an energy storage of the vehicle via a vehicle-mounted charger;
accessing, by using a computer, a storage medium to read a lock state information stored therein, the lock state information indicating a rotation shaft is in a rotation capable unlock state or a rotation incapable lock state, the rotation shaft being provided to a driving-power transmitting mechanism transmitting driving power to a driving wheel; and
when the lock state information stored in the storage medium describes that the rotation shaft is in the rotation capable unlock state, disabling, by a computer, the vehicle-mounted charger to supply power from the external power supply to the energy storage,
wherein the vehicle includes a lock mechanism including an electromagnetic actuator that switches the rotation shaft between the rotation capable unlock state and the rotation incapable lock state, and
wherein the method further comprises driving, by a computer, the electromagnetic actuator according to a driver's operation on an operation unit.

11. A vehicle comprising:
an energy storage;
a vehicle-mounted charger;
an inlet connected to the energy storage through the vehicle-mounted charger, the inlet being to be connected to a connector of an external power supply;
a main Electronic Control Unit (ECU);

a shifter ECU;
a charge ECU, wherein the main ECU, the shifter ECU and the charge ECU are linked to one another via an information transmission path; and
a parking lock mechanism,
wherein a power of the external power supply is supplied to the energy storage through the vehicle-mounted charger by connecting the connector of the external power supply to the inlet,
the parking lock mechanism causes a rotation shaft to enter a rotation capable unlock state or a rotation incapable lock state, the rotation shaft being provided to a driving-power transmitting mechanism transmitting driving power to a driving wheel, and the parking lock mechanism generates a lock state signal which indicates the rotation capable unlock state or the rotation incapable lock state of the rotation shaft,
the main ECU controls a vehicle driving motor, an inverter, a shift-by-wire system, and a power system,
the shifter ECU sends a control signal to a shift driver according to a signal based on a gear shifting operation by an operator,
the charge ECU includes a storage device which store a lock state information corresponding to the lock state signal, and controls the vehicle-mounted charger using the lock state information stored in the storage device, and
in a state in which the connector is connected to the inlet to charge the energy storage, the charge ECU is activated, and the shifter ECU is deactivated.

* * * * *